(12) United States Patent
Zheng (10) Patent No.: US 12,481,598 B2
(45) Date of Patent: Nov. 25, 2025

(54) MEMORY SCANNING METHOD AND APPARATUS

(71) Applicant: HANGZHOU ALICLOUD FEITIAN INFORMATION TECHNOLOGY CO., LTD., Hangzhou (CN)

(72) Inventor: Hao Zheng, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,135

(22) PCT Filed: Feb. 3, 2023

(86) PCT No.: PCT/CN2023/074446
§ 371 (c)(1),
(2) Date: Feb. 20, 2024

(87) PCT Pub. No.: WO2023/160358
PCT Pub. Date: Aug. 31, 2023

(65) Prior Publication Data
US 2024/0354258 A1     Oct. 24, 2024

(30) Foreign Application Priority Data

Feb. 24, 2022   (CN) .......................... 202210176634.7

(51) Int. Cl.
*G06F 12/1009* (2016.01)
*G06F 12/0873* (2016.01)

(52) U.S. Cl.
CPC ...... *G06F 12/1009* (2013.01); *G06F 12/0873* (2013.01); *G06F 2212/657* (2013.01)

(58) Field of Classification Search
CPC ............ G06F 12/1009; G06F 12/0873; G06F 2212/657; G06F 11/3037; G06F 9/45558; G06F 2009/45583; Y02D 10/00
See application file for complete search history.

(56) References Cited

U.S. PATENT DOCUMENTS 10,810,037 B1 * 10/2020 Liu ..................... G06F 9/45558
11,237,981 B1 *  2/2022 Habusha ............. G06F 12/0835
(Continued)

FOREIGN PATENT DOCUMENTS

CN         108021442 A      5/2018
CN         108628663 A     10/2018
(Continued)

OTHER PUBLICATIONS

PCT International Search Report for PCT/CN2023/074446 entitled "Memory Scanning Method and Apparatus", mailed on May 11, 2023, (6 pages including English-language translation).
(Continued)

*Primary Examiner* — Sean D Rossiter
(74) *Attorney, Agent, or Firm* — Clark Hill PLC (57) ABSTRACT

Provided in the embodiments of the present specification are a memory scanning method and apparatus, wherein the method includes: determining a reserved memory scanning range at a preset time interval; scanning reserved memory to be scanned within the reserved memory scanning range and determining a current cold and hot state of the reserved memory to be scanned; and determining a target record table for the current cold and hot state of the reserved memory to be scanned according to the current cold and hot state of the reserved memory to be scanned and recording the current cold and hot state of the reserved memory to be scanned into the target record table.

18 Claims, 4 Drawing Sheets

(56) References Cited

U.S. PATENT DOCUMENTS

| | | | |
|---|---|---|---|
| 2018/0024750 A1 | 1/2018 | Hassan | |
| 2019/0114272 A1* | 4/2019 | Dubey | G06F 12/0246 |
| 2020/0285391 A1* | 9/2020 | Sun | G06F 3/0649 |
| 2020/0334067 A1 | 10/2020 | Liu et al. | |
| 2021/0064535 A1* | 3/2021 | Han | G06F 3/0611 |
| 2022/0050722 A1* | 2/2022 | Dugast | G06F 9/5016 |
| 2022/0137860 A1* | 5/2022 | Zhuo | G06F 3/0655 |
| | | | 711/154 |
| 2023/0127449 A1* | 4/2023 | Kim | G06F 3/0604 |
| | | | 711/154 |
| 2024/0311297 A1* | 9/2024 | Ammari | G06F 12/08 |
| 2025/0027681 A1* | 1/2025 | Moon | F24H 15/174 |

FOREIGN PATENT DOCUMENTS

| | | |
|---|---|---|
| CN | 110134492 B | 4/2021 |
| CN | 113296886 A | 8/2021 |
| CN | 113296940 A | 8/2021 |
| CN | 113434371 A | 9/2021 |
| CN | 114579253 A | 6/2022 |

OTHER PUBLICATIONS

Chinese First Office Action issued Jan. 8, 2025 in CN Application No. 202210176634.7, entitled "Memory scanning method and device" (13 pages including English-language translation).
Extended European Search Report of European Patent Application No. 23758983.3 based on PCT/CN2023/074446, entitled "Memory Scanning Method and Apparatus," dated Jun. 10, 2025 (11 pages).

* cited by examiner

MEMORY SCANNING METHOD AND APPARATUS

CROSS-REFERENCE TO RELATED APPLICATIONS

This is an application under 35 U.S.C. § 371 of International Application No. PCT/CN2023/074446 filed Feb. 3, 2023, entitled "MEMORY SCANNING METHOD AND APPARATUS", which claims priority to Chinese Patent Application No. 202210176634.7 filed with the Chinese Patent Office on Feb. 24, 2022, and entitled "MEMORY SCANNING METHOD AND APPARATUS", which is incorporated herein by reference in its entirety.

TECHNICAL FIELD

The embodiments of this description relate to the technical field of computers and, in particular to a memory scanning method.

BACKGROUND

In new virtualization scenarios, in the allocation architecture of the host memory, in order to save the metadata overhead of host memory management, most of the host memory may be reserved so that it can be used by a virtual machine in the future. The reserved memory is not available for the host kernel, and the original Lru and other functions of the kernel cannot monitor a cold and hot state of the reserved memory. Because the reserved memory is often used by a virtual machine and has certain particularity, in order to acquire the conditions of the reserved memory, such as the access popularity, functions such as scanning the cold and hot level of the reserved memory and collecting information are required.

However, the acquired cold and hot state of the reserved memory is just the cold and hot condition at the very moment, which cannot reflect the change of the cold and hot state in the reserved memory or hot and cold aging condition of the memory.

SUMMARY

In view of the above problem, the embodiments of this specification provide a memory scanning method. Meanwhile, one or more embodiments of this specification relate to a memory scanning apparatus, a compute device, a computer-readable storage medium and a computer program, so as to eliminate the technical defects existing in the prior art.

According to the first aspect of the embodiments of this specification, there is provided a memory scanning method applied to a host, which includes:
  determining a reserved memory scanning range at a preset time interval, wherein reserved memory constitutes part of host memory;
  scanning reserved memory to be scanned within the reserved memory scanning range and determining a current cold and hot state of the reserved memory to be scanned; and
  determining a target record table for the current cold and hot state of the reserved memory to be scanned according to the current cold and hot state of the reserved memory to be scanned and recording the current cold and hot state of the reserved memory to be scanned into the target record table.

According to the second aspect of the embodiments of this specification, there is provided a memory scanning apparatus applied to a host, which includes:
  a scanning range determining module configured for determining a reserved memory scanning range at a preset time interval, wherein reserved memory constitutes part of host memory;
  a memory scanning module configured for scanning reserved memory to be scanned within the reserved memory scanning range and determining a current cold and hot state of the reserved memory to be scanned; and
  a memory state recording module configured for determining a target record table for the current cold and hot state of the reserved memory to be scanned according to the current cold and hot state of the reserved memory to be scanned and recording the current cold and hot state of the reserved memory to be scanned into the target record table.

According to the third aspect of the embodiments of this specification, there is provided a computing device, which includes:
  a memory and a processor;
  wherein the memory is configured for storing computer-executable instructions, and the processor is configured for executing the computer-executable instructions that, when executed by the processor, implement the steps of the memory scanning method described above.

According to the fourth aspect of the embodiments of this specification, there is provided a computer-readable storage medium having computer-executable instructions stored thereon that, when executed by a processor, implement the steps of the memory scanning method described above.

According to the fifth aspect of the embodiments of the present specification, there is provided a computer program that, when executed in a computer, the computer program causes the computer to perform the steps of the memory scanning method described above.

A memory scanning method and apparatus are implemented in an embodiment of the present description, wherein the method includes: determining a reserved memory scanning range at a preset time interval, wherein reserved memory constitutes part of host memory; scanning reserved memory to be scanned within the reserved memory scanning range and determining a current cold and hot state of the reserved memory to be scanned; and determining a target record table for the current cold and hot state of the reserved memory to be scanned according to the current cold and hot state of the reserved memory to be scanned and recording the current cold and hot state of the reserved memory to be scanned into the target record table.

Specifically, in the memory scanning method, cold and hot scanning is periodically (at a preset time interval) performed on the reserved memory in the host memory, and the current cold and hot state of the reserved memory of each cold and hot scanning is recorded into a target record table, such that the changes of the cold and hot state of the reserved memory may be subsequently queried according to the target record table, and the cold and hot aging condition of the reserved memory may be determined according to the changes of the cold and hot state of the reserved memory in the target record table.

DETAILED DESCRIPTION

In the following description, numerous specific details are set forth to facilitate a thorough understanding of this specification. However, this specification can be implemented in many other ways different from those described herein. Those skilled in the art may make similar extensions without departing from the scope of this specification, so this specification is not limited to the specific implementations disclosed below.

The terms used in one or more embodiments of this specification are for the purpose of describing specific embodiments only and are not intended to limit the one or more embodiments of this specification. The singular forms "a", "said" and "the" used in the one or more embodiments of this specification and the appended claims are also intended to include the plural forms, unless the context clearly indicates otherwise. It should also be understood that the term "and/or" used in the one or more embodiments of this specification refers to and contains any or all possible combinations of one or more associated listed items.

It should be understood that although that term first, second, etc. may be used to describe various information in the one or more embodiment of this specification, the information should not be limited to these terms. These terms are only used to distinguish information of the same type from each other. For example, without departing from the scope of the one or more embodiments of this specification, the first may also be called the second, and similarly, the second may also be called the first. Depending on the context, the word "if" as used herein may be interpreted as "when" or "while" or "in response to the determination that".

First, explanation is made on the noun terms involved in the one or more embodiments of this specification.

vmem: memory management module that manages reserved memory of a host.

mmap structure: a dedicated structure that manages memory information allocated to a VM (virtual machine).

access: there is one access bit in a page table, recording whether this page has been accessed; in a case that the access bit is set, it may be determined that this page is accessed and belongs to a hot page; in a case that the access bit is not set, it may be determined that this page is not accessed and belongs to a cold page.

pin operation: bind memory operation.

inactive: collection of cold pages.

active: collection of hot pages.

paused table: collection of pages that are suspended from scanning.

pinned table: collection of pages that do not participate in scanning.

paddr: physical address.

vaddr: virtual address.

ept page table: page table of VM under kvm virtualization architecture.

bitmap: bitmap of a cold and hot state of memory.

Reserved Memory: reserved memory.

Kernel: kernel.

KVM: virtualization architecture.

vstat: computer application that collects memory information.

In this specification, there is provided a memory scanning method. Meanwhile, this specification also relates to a memory scanning apparatus, a computing device, and a computer-readable storage medium, which are described in detail in the following embodiments one by one.

Figure 1:
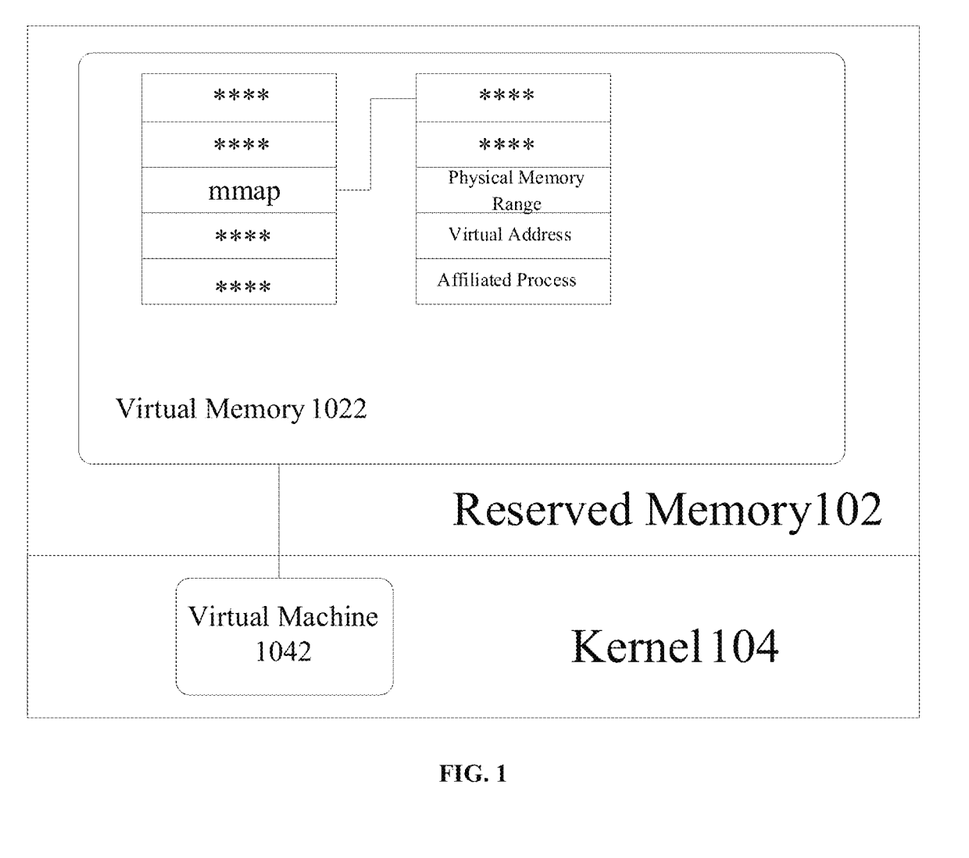
FIG. 1 is a schematic diagram of the mmap structure in the memory scanning method provided by one embodiment of this specification.

Referring to FIG. 1, FIG. 1 shows a schematic diagram of the mmap structure in the memory scanning method provided according to one embodiment of this specification.

Reserved memory 102 and a kernel 104 are included in FIG. 1, wherein a virtual machine 1042 runs in the kernel 104, and the reserved memory 102 is allocated to the virtual machine 1042, such as a virtual memory 1022, for use.

As shown in FIG. 1, when every vmem is allocated, the reserved memory will establish a corresponding mmap structure for it. The mmap structure records the physical memory range, corresponding virtual address, affiliated process and other information in this allocation, and all the allocated reserved memory will be recorded into the linked list of this mmap structure. In practice, when scanning the reserved memory for their cold and hot state, virtual address corresponding to the reserved memory will be determined according to the mmap structure.

In the practical application, whether one section of reserved memory is a hot page or not may be determined by traversing the page table according to its physical address or virtual address to query whether the access bit of its page table has been set. In a case that the access bit has been set, it indicates that the reserved memory is a hot page, otherwise it indicates that the reserved memory is a cold page. Of course, the page may be a big page or a small page. In fact, when traversing the page table, it is necessary to search for the banner status of the corresponding hierarchical page table according to the size of the page table.

In addition, after one traversing and querying, it is necessary to clear the access bit of the page table, otherwise it is likely that all the access bit of the reserved memory will be used and set to 1 (that is, indicating a hot page) with the deduction of time, and therefore whether the reserved memory has been accessed in the current scanning cycle cannot be reflected.

Moreover, the cold and hot state of the reserved memory is constantly changing. In order to obtain this change of the reserved memory in real time, it is necessary to periodically scan the cold and hot state of the reserved memory. At the same time, the cold and hot condition of the reserved memory is still constantly changing, that is, in a case that it might be a cold page at the previous moment, it may remain the same or it may change at the next moment. Therefore, in order to accurately obtain the usage of the reserved memory, it is also necessary to know the cold and hot aging of the reserved memory.

Figure 2:
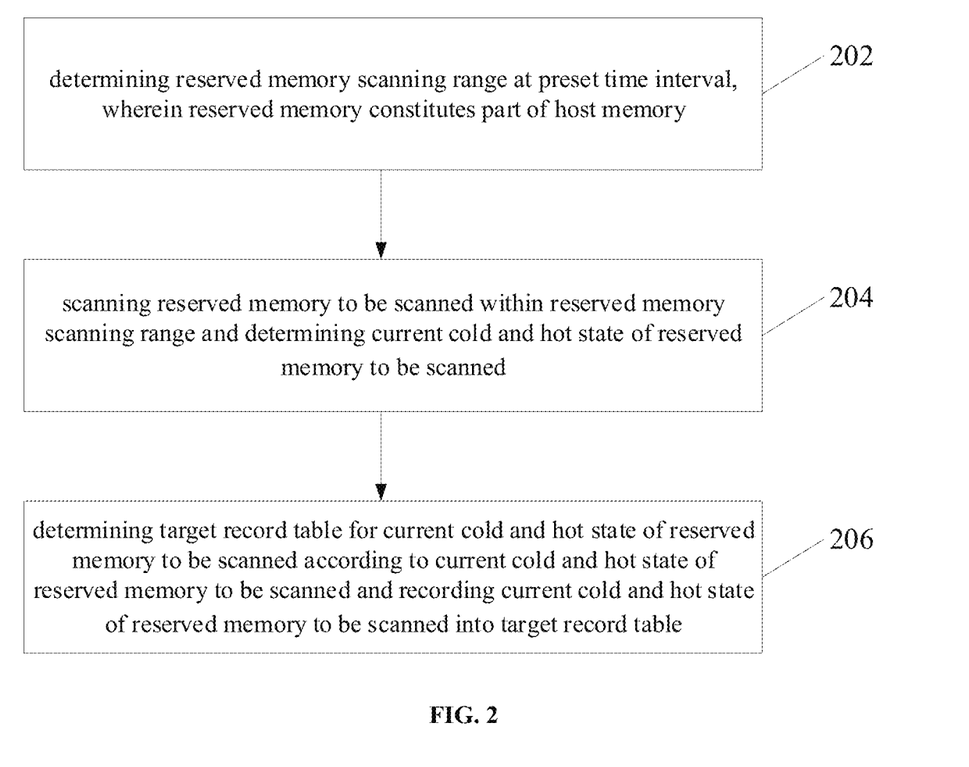
FIG. 2 is a flowchart of the memory scanning method provided by one embodiment of this specification.

Referring to FIG. 2, FIG. 2 shows a flowchart of the memory scanning method provided according to one embodiment of this specification, wherein the method is applied to a host, and specifically includes the following steps.

In the practical application, the cold and hot state of the reserved memory will be periodically scanned. For ease of understanding, it is introduced by taking one round of scanning of the reserved memory as an example in an embodiment of this specification, and the methods of other rounds of scanning may refer to the specific implementation steps of this embodiment.

Step 202: determining a reserved memory scanning range at a preset time interval, wherein reserved memory constitutes part of host memory.

Among others, the preset time interval may be set according to the actual application. This specification will not impose any limitations on it. For example, it may be set as 1 hour, 1 day, etc.

In an implementable scheme, in order to prevent the start and stop of the virtual machine from influencing the memory scanning range, a scanning range lock may be added to the memory scanning range. For example, determine the reserved memory scanning range every preset time interval (i.e., periodically), and add a scanning range lock for the reserved memory to be scanned within the reserved memory scanning range.

In the practical application, the host will assign one kernel thread (or if the virtual machine is started) to periodically scan and monitor the allocated reserved memory, that is, the kernel thread will periodically determine the reserved memory scanning range and scan the reserved memory to be scanned within the reserved memory scanning range. In order to avoid the conflict between a cold and hot scanning-related operation of the reserved memory to be scanned and a cold and hot scanning operation of the reserved memory to be scanned this time, one scanning range lock will be acquired to lock the reserved memory to be scanned within the reserved memory scanning range to be scanned in this round.

Step 204: scanning the reserved memory to be scanned within the reserved memory scanning range and determining the current cold and hot state of the reserved memory to be scanned.

Specifically, the scanning the reserved memory to be scanned within the reserved memory scanning range and determining the current cold and hot state of the reserved memory to be scanned includes:
- determining a physical memory address of the reserved memory to be scanned within the reserved memory scanning range;
- determining a virtual address corresponding to the physical memory address of the reserved memory to be scanned by a preset query method, in a case that there is a virtual page table; and
- traversing and querying an access bit of the corresponding virtual page table through the virtual address and determining the current cold and hot state of the reserved memory to be scanned according to the current set state of the access bit.

Among others, in the memory scanning method, the granularity for an algorithm for scanning the reserved memory in each round may be 1 g, 2 m, 4 k, etc. The embodiment of this specification will not impose any limitations on it.

And in the virtualization scenario, there will be virtual page tables (that is, virtualization page tables, ept page tables); in other reserved memory usage scenarios, virtual page tables may not exist. Therefore, the existence of virtual page tables may be determined according to the actual application scenario.

In the specific implementation, firstly determine the physical memory address of the reserved memory to be scanned, and determine the virtual address corresponding to the physical memory address of the reserved memory to be scanned by the preset query method, in a case that there is a virtual page table according to the usage scenario of the reserved memory to be scanned; then traverse and query the access bit of the corresponding virtual page table through the virtual address, and determine the current cold and hot state of the reserved memory to be scanned according to the current set state of the access bit.

In a case that no virtual page table exists, a kernel page table may be directly queried, for example, the access bit of the corresponding kernel page table is traversed and queried through the physical memory address of the reserved memory to be scanned, and the current cold and hot state of the reserved memory to be scanned may be determined according to the current set state of the access bit of the kernel page table. For details, please refer to the detailed implementation of the above embodiment.

In the embodiment of this specification, in the virtualization scenario, traverse and query the access bit of the corresponding virtual page table through the virtual address corresponding to the physical memory address of the reserved memory to be scanned, and quickly determine the current cold and hot state of the reserved memory to be scanned according to the current set state of the access bit.

In the practical application, scanning the reserved memory to be scanned within the reserved memory scanning range requires scanning physical address of the reserved memory corresponding to the reserved memory to be scanned. The reserved memory scanning range includes two parts: a target hot page record table and a target cold page record table. In a case that the reserved memory scanning range corresponds to the target hot page record table, the cold and hot state of the reserved memory to be scanned in the target hot page record table will be scanned during specific scanning. In a case that the reserved memory scanning range corresponds to the target cold page record table, the cold and hot state of the reserved memory to be scanned in the target cold page record table will be scanned during the specific scanning. The specific implementation method is as follows:
- the determining the physical memory address of the reserved memory to be scanned includes:
- determining the target record table corresponding to the reserved memory scanning range, wherein the target record table includes a target hot page record table and a target cold page record table;
- determining the physical memory address of the reserved memory to be scanned in the target cold page record table; and
- determining the physical memory address of the reserved memory to be scanned in the target hot page record table, in a case that all the reserved memory to be scanned in the target cold page record table has been scanned and the target cold page record table or the target hot page record table meets a preset scanning condition.

Among others, the preset scanning condition may be set according to the actual application, for example, the time from the previous time scanning the target hot page record table to the current time exceeds a preset time threshold (that is, the target hot page record table has not been scanned for a long time), or the amount of the reserved memory to be scanned in the target cold page record table is less than or equal to a preset threshold amount (that is, the amount of the reserved memory to be scanned in the target hot page record table is small).

Specifically, there are two situations when determining the physical memory address of the reserved memory to be scanned. One situation is to use the physical memory address of the reserved memory to be scanned in the target cold page record table as scanning address. The other situation is to use physical memory address of the reserved memory to be scanned in the target hot page record table as scanning address, in a case that all the reserved memory to be scanned in the target cold page record table has been scanned and the target cold page record table or the target hot page record table meets the preset scanning condition.

Firstly, determine a target cold page record table and a target hot page record table corresponding to the reserved memory scanning range, and then determine the physical memory address of the reserved memory to be scanned in the target cold page record table for subsequent scanning; and then determine physical memory address of the reserved memory to be scanned in the target hot page record table for subsequent scanning, in a case that all the reserved memory to be scanned in the target cold page record table has been scanned and the target cold page record table or the target hot page record table meets the preset scanning condition.

In the embodiment of this specification, the reserved memory to be scanned in the target hot page record table and the target cold page record table corresponding to the reserved memory scanning range will be scanned according to the actual scanning situation, that is, physical memory address of the reserved memory to be scanned in the target hot page record table will be acquired and physical memory address of the reserved memory to be scanned in the target cold page record table will be acquired, and the cold and hot state of the reserved memory to be scanned may be quickly scanned and determined by the physical memory address.

In the specific implementation, the way to scan the cold and hot state of the reserved memory to be scanned in the target hot page record table is the same as the way to scan the cold and hot state of the reserved memory to be scanned in the target cold page record table, that is, determine the virtual address corresponding to the physical memory address of the reserved memory to be scanned by a preset query method, in a case that there is a virtual page table; and traverse and query the access bit of the corresponding virtual page table through the virtual address, and determine the current cold and hot state of the reserved memory to be scanned according to the current set state of the access bit.

As can be seen according to the above embodiment and FIG. 1, in the embodiment of this specification, when every vmem is allocated, the reserved memory will establish a corresponding mmap structure for it, and the mmap structure will record the physical memory range, corresponding virtual address, affiliated process and other information of this allocation. Therefore, the virtual address corresponding to the physical memory address of the reserved memory to be scanned may be acquired from the mmap structure. The specific implementation method is as follows:

the determining the virtual address corresponding to the physical memory address of the reserved memory to be scanned by the preset query method includes:
determining, in a case that there is a cache memory mapping structure corresponding to the physical memory address of the reserved memory to be scanned, the virtual address corresponding to the physical memory address of the reserved memory to be scanned according to the cache memory mapping structure; or
acquiring a linked list of a memory mapping structure for allocating the reserved memory and adding a linked list lock to the linked list of the memory mapping structure, in a case that there is no cache memory mapping structure corresponding to the physical memory address of the reserved memory to be scanned;
traversing the linked list of the memory mapping structure to determine the memory mapping structure corresponding to the physical memory address of the reserved memory to be scanned; and
determining the virtual address corresponding to the physical memory address of the reserved memory to be scanned according to the memory mapping structure and adding the memory mapping structure to a cache.

In the practical application, there are two situations when querying the virtual address corresponding to the physical memory address of the reserved memory to be scanned through the mmap structure. One situation is that the mmap structure corresponding to the physical memory address of the reserved memory to be scanned is present in the cache, and the corresponding mmap structure may be directly obtained from the cache to query the virtual address corresponding to the physical memory address of the reserved memory to be scanned. The other situation is that the mmap structure corresponding to the physical memory address of the reserved memory to be scanned is not present in the cache, and it is necessary to acquire the corresponding mmap structure from a linked list of mmap structure to query the virtual address corresponding to the physical memory address of the reserved memory to be scanned.

Specifically, determine whether the physical memory address of the reserved memory to be scanned has the corresponding cache memory mapping structure (mmap structure). If yes, acquire the corresponding cache memory mapping structure for the physical memory address of the reserved memory to be scanned, and determine the virtual address corresponding to the physical memory address of the reserved memory to be scanned according to the memory mapping structure. If no, acquire a linked list of a memory mapping structure for allocating the reserved memory, and add a linked list lock to the linked list of the memory mapping structure; then traverse the linked list of the memory mapping structure to determine the memory mapping structure corresponding to the physical memory address of the reserved memory to be scanned; and then determine virtual address corresponding to the physical memory address of the reserved memory to be scanned according to the memory mapping structure, and meanwhile add the memory mapping structure to the cache, to ensure that the memory mapping structure can be directly acquired from the cache when it is used next time, so as to avoid having to lock every query, etc., causing waste of resources.

After determining the virtual address corresponding to the physical memory address of the reserved memory to be scanned, the access bit of the corresponding virtual page table may be traversed and queried through the virtual address, so that the current cold and hot state of the reserved memory to be scanned may be quickly determined according to the current set state of the access bit. The specific implementation method is as follows:

the traversing and querying the access bit of the corresponding virtual page table through the virtual address and determining the current cold and hot state of the reserved memory to be scanned according to the current set state of the access bit includes:
traversing and querying the access bit of the corresponding virtual page table through the virtual address;
determining the current set state of the access bit, in a case that the query is successful; and
determining whether the current set state has been set,
if yes, clearing the current set state of the access bit and determining that the current cold and hot state of the reserved memory to be scanned is a hot state; and
if no, traversing and querying an access bit of a corresponding kernel page table through the virtual address, and determining the current cold and hot state of the reserved memory to be scanned according to the current set state of the access bit of the memory page table.

Among others, in a case that the query is successful, it may be understood as there being the corresponding virtual page table for the virtual address. In a case that the query fails, it may be understood as the virtual page table corresponding to the virtual address having a problem. It is likely that the original mmap has been released when scanning with backup, resulting in the release of its kernel page table, and therefore the query fails. At this time, the next reserved memory to be scanned may be scanned directly.

Specifically, traverse and query the access bit of the corresponding virtual page table through the virtual address; in a case that the query is successful, determine the current set state of the access bit, and in a case that the current set state has been set, clear the current set state of the access bit, and meanwhile set the position corresponding to the physical memory address in the corresponding bitmap in this round of scanning to 1 (indicating a hot page, this setting being an unnecessary operation step as the setting is made according to the actual situation), and determine that the current cold and hot state of the reserved memory to be scanned is a hot state; in a case that the current set state has not been set, continue to traverse and query the corresponding kernel page table according to the virtual address, and determine the current hot/cold state of the reserved memory to be scanned according to the current set state of the access bit of the memory page table. The specific method is as follows:

the traversing and querying the access bit of the corresponding kernel page table through the virtual address and determining the current cold and hot state of the reserved memory to be scanned according to the current set state of the access bit of the memory page table includes:

traversing and querying the access bit of the corresponding virtual page table through the virtual address and determining the current set state of the access bit of the kernel page table; and determining whether the current set state has been set, if yes, clearing the current set state of the access bit and determining that the current cold and hot state of the reserved memory to be scanned is a hot state; and if no, determining that the current cold and hot state of the reserved memory to be scanned is a cold state.

Specifically, in a case that the current set state of the access bit of the kernel page table has been set, clear the current set state of the access bit, at the same time set the positions corresponding to the physical memory address in the corresponding bitmap in this round of scanning to 1 (indicating a hot page), and determine that the current cold and hot state of the reserved memory to be scanned is a hot state; in a case that the current set state has not been set, keep the current set state of the access bit, at the same time set the positions corresponding to the physical memory address in the corresponding bitmap in this round of scanning to 0 (indicating a cold page), and determine that the current cold and hot state of the reserved memory to be scanned is a cold state.

Step 206: determining the target record table for the current cold and hot state of the reserved memory to be scanned according to the current cold and hot state of the reserved memory to be scanned and recording the current cold and hot state of the reserved memory to be scanned into the target record table.

Specifically, after acquiring the current cold and hot state of the reserved memory to be scanned, determine the target record table of the current cold and hot state of the reserved memory to be scanned according to the current cold and hot state of the reserved memory to be scanned and record the current cold and hot state of the reserved memory into the target record table. The specific implementation method is as follows:

the determining the target record table for the current cold and hot state of the reserved memory to be scanned according to the current cold and hot state of the reserved memory to be scanned and recording the current cold and hot state of the reserved memory to be scanned into the target record table includes:

in a case that the current cold and hot state of the reserved memory to be scanned is a hot state, determining the target hot page record table corresponding to the hot state of the reserved memory to be scanned and recording the hot state of the reserved memory to be scanned into the target hot page record table; and in a case that the current cold and hot state of the reserved memory to be scanned is a cold state, determining the target cold page record table corresponding to the cold state of the reserved memory to be scanned and recording the cold state of the reserved memory to be scanned into the target cold page record table.

Among others, the target record table includes a target hot page record table, in which hot pages are recorded, and a target cold page record table, in which cold pages are recorded.

In the practical application, in a case that the current cold and hot state of the reserved memory to be scanned is a hot state, it may be determined that it needs to be recorded in the target hot page record table that the current cold and hot state of the reserved memory to be scanned is a hot state, and in a case that the current cold and hot state of the reserved memory to be scanned is a cold state, it may be determined that it needs to be recorded in the target cold page record table that the current cold and hot state of the reserved memory to be scanned is a cold state.

That is to say, the cold and hot state of the reserved memory to be scanned after scanning will be divided into two parts, namely, inactive (i.e., the target cold page record table) and active (i.e., the target hot page record table). Information in the table may be recorded in a linked list structure, or in other structure such as an array structure. This specification will not impose any limitations on the structure. The physical address of the reserved memory are recorded in the middle of the inactive and active tables (as virtual address of different processes may be duplicated), so as to uniquely identify one reserved memory; moreover, the header is the oldest information, that is, the reserved memory which has not changed its access status for the longest time; the footer is the latest information, that is, the reserved memory that has recently changed its access status. In this way, the header of the inactive table is the oldest memory that has not been accessed recently, and in each round of scanning of the inactive table, cold and hot condition of the reserved memory recorded in the inactive table will be determined, while for the active table, scanning will be made on demand. Of course, additional tables may also be added. For example, the reserved memory not intended to participate in scanning may be placed in the 'paused' table, and the pages that are explicitly particularly active may be placed in the 'pinned' table. This specification will not impose any limitations on it.

In the specific implementation, in a case that the reserved memory to be scanned is already in the target hot page record table before but is found to be in a cold state in this round of scanning, it needs to be deleted from the target hot page record table and then added to the target cold page record table. In a case that the reserved memory to be scanned is already in the target hot page record table before and is found to still be in a hot state in this round of scanning, the information about the reserved memory to be scanned in the target hot page record table remains unchanged. Similarly, in a case that the reserved memory to be scanned is already in the target cold page record table before but is found in a hot state in this round of scanning, it needs to be deleted from the target cold page record table and then added to the target hot page record table. In a case that the reserved memory to be scanned is already in the target cold page record table before and is found to still be in a cold state in this round of scanning, the information about the reserved memory to be scanned in the target cold page record table remains unchanged. This ensures the information in the target cold page record table and the target hot page record table not be disordered. The specific implementation method is as follows:

the determining the target record table for the current cold and hot state of the reserved memory to be scanned according to the current cold and hot state of the reserved memory to be scanned and recording the current cold and hot state of the reserved memory to be scanned into the target record table includes:

in a case that the current cold and hot state of the reserved memory to be scanned in the target hot page record table is a hot state, determining the target hot page record table corresponding to the hot state of the reserved memory to be scanned and recording the hot state of the reserved memory to be scanned into the target hot page record table;

in a case that the current cold and hot state of the reserved memory to be scanned in the target hot page record table is a cold state, determining the target cold page record table corresponding to the cold state of the reserved memory to be scanned, deleting the reserved memory to be scanned in the target hot page record table and recording the cold state of the reserved memory to be scanned into the target cold page record table; or in a case that the current cold and hot state of the reserved memory to be scanned in the target cold page record table is a hot state, determining the target hot page record table corresponding to the hot state of the reserved memory to be scanned, deleting the reserved memory to be scanned in the target cold page record table and recording the hot state of the reserved memory to be scanned into the target hot page record table; and in a case that the current cold and hot state of the reserved memory to be scanned in the target cold page record table is a cold state, determining the target cold page record table corresponding to the cold state of the reserved memory to be scanned and recording the cold state of the reserved memory to be scanned into the target cold page record table.

In addition, because both the header of the target hot page record table and the header of the target cold page record table record relatively old information, that is, the header is the reserved memory whose access status has not changed for a relatively long time, and the footers thereof record relatively new information, that is, the footer is the reserved memory whose access status has changed relatively recently, the header of the target cold page record table is the reserved memory that has not been accessed recently for the longest time, so that the aging of the reserved memory may be determined through the target cold page record table. The specific implementation method is as follows:

the recording the cold state of the reserved memory to be scanned into the target cold page record table includes:
recording the cold state of the reserved memory to be scanned to the end of the target cold page record table; and accordingly, the recording the hot state of the reserved memory to be scanned into the target hot page record table includes:

recording the hot state of the reserved memory to be scanned to the end of the target hot page record table.

In the practical application, during each round of scanning, in a case that there is an external stop scanning instruction, the scanning may be exited, the next scanning cycle may be set, and wait for the next scanning cycle to start scanning the reserved memory.

At the same time, the duration of each round of scanning will be determined. In a case that the duration is longer than a preset time threshold, in order to avoid the scanning process taking too long and occupying the CPU for a long time, causing other processes unable to access the CPU for execution, the kernel processes may be actively scheduled, releasing the original scanning range lock, actively scheduling to reacquire the scanning range lock, updating the reserved memory scanning range (i.e., the memory scanning range may be updated during the process scheduling), and scanning forward from the previous scanning position.

In the specific implementation, the allocation and release of the reserved memory may occur simultaneously in the specific scanning process, which may affect the reserved memory scanning range. For example, for the newly allocated reserved memory, it can be understood that the reserved memory scanning range needs to be enlarged. In a case that the scanning process is in progress, the updating of the reserved memory scanning range will be suspended, and then the reserved memory scanning range to be scanned will be updated after this round of scanning (that is, the newly allocated reserved memory will be added to the next round of scanning), and thus the interrupt of scanning process in this around is avoided. In a case that the scanning process is not running, the reserved memory scanning range of the reserved memory to be scanned may be directly updated to ensure the integrity of scanning. The specific implementation method is as follows:

the method further includes:
adding, in a case that there is new reserved memory and the reserved memory to be scanned has been scanned, the new reserved memory to the reserved memory scanning range.

Among others, the newly added reserved memory may be understood as the newly allocated memory mentioned above.

In the practical application, the newly allocated reserved memory is very likely to be accessed (such as by the pin operation of the memory, that is, the binding operation of the memory), and it is scanned out to be hot page, so its real cold and hot state cannot be distinguished (in fact, many pages are not really used). At this time, all the access bit of the corresponding page table may be cleared and marked as cold pages, and the cold and hot state of the newly allocated reserved memory may be determined and updated in the next round of scanning.

The other situation is that, in the specific scanning process, in a case that release of the reserved memory (the reserved memory to be scanned in this round) occurs, it is necessary to acquire the scanning range lock of the reserved memory scanning range, so as to update the reserved memory scanning range. After acquiring the scanning range lock, the scanning process is suspended, the released reserved memory is deleted from the scanning process, and the data structure that records the cold and hot state of the released reserved memory is also deleted. The specific implementation method is as follows:

the method, further including:
acquiring the scanning range lock and suspending the scanning of the reserved memory to be scanned within the reserved memory scanning range, in a case that there is reserved memory to be scanned within the reserved memory scanning range being released; and
deleting the released reserved memory to be scanned from the reserved memory scanning range and deleting the memory mapping structure corresponding to the released reserved memory to be scanned.

In the specific implementation, because updating the reserved memory scanning range may be an asynchronous operation, it is possible that the reserved memory to be scanned has been released before updating the reserved memory scanning range. At this time, a failure of this round of scanning of the reserved memory to be scanned may occur, that is, the reserved memory to be scanned in this failed scanning belong to the reserved memory that were released, which conforms to the expected logic and does not affect the subsequent scanning operation.

In the process of scanning, in a case that there is a behavior of changing the recorded scan information data such as a hot upgrade of the scanning process (i.e., the kernel thread executing the scanning process of the reserved memory to be scanned), it is also necessary to suspend scanning and acquire the scanning range lock, so as to update the data structure of the recorded cold and hot information and avoid the failure of subsequent scanning.

In the memory scanning method provided by the embodiment of the specification, cold and hot scanning is periodically (at a preset time interval) performed on reserved memory in host memory, and the current cold and hot state of the reserved memory of each cold and hot scanning is recorded into a target record table, such that changes of the cold and hot state in the reserved memory may be subsequently queried according to the target record table, and the cold and hot aging of the reserved memory may be determined according to the changes of the cold and hot state of the reserved memory in the target record table.

That is to say, the principle and framework of monitoring the cold and hot aging of the reserved memory on the host include periodic scanning of the reserved memory, updating of information such as the reserved memory scanning range during the scanning process, as well as distinguishing of the cold and hot tables and recording of the aging condition. Furthermore, during a round of periodic scanning of the reserved memory, traverse the corresponding EPT page table (virtual page table, virtualization page table) and the kernel page table of the reserved memory within the reserved memory scanning range to acquire the cold and hot state of its memory, and update the corresponding inactive and active aging tables. Subsequently, the cold and hot changes and aging of reserved memory may be queried based on the inactive and active tables. In the practical application, it is said that the page that was first put into the inactive table is placed in the header; and subsequently added pages are placed in the footer one after another. In this way, with the passage of time, the page in the header will undergo aging precipitation, which is unused for a longer time than the footer, and it is likely to be inactive in the future. Therefore, the cold and hot changes and aging of the reserved memory may be determined according to the inactive and active tables.

Figure 3:
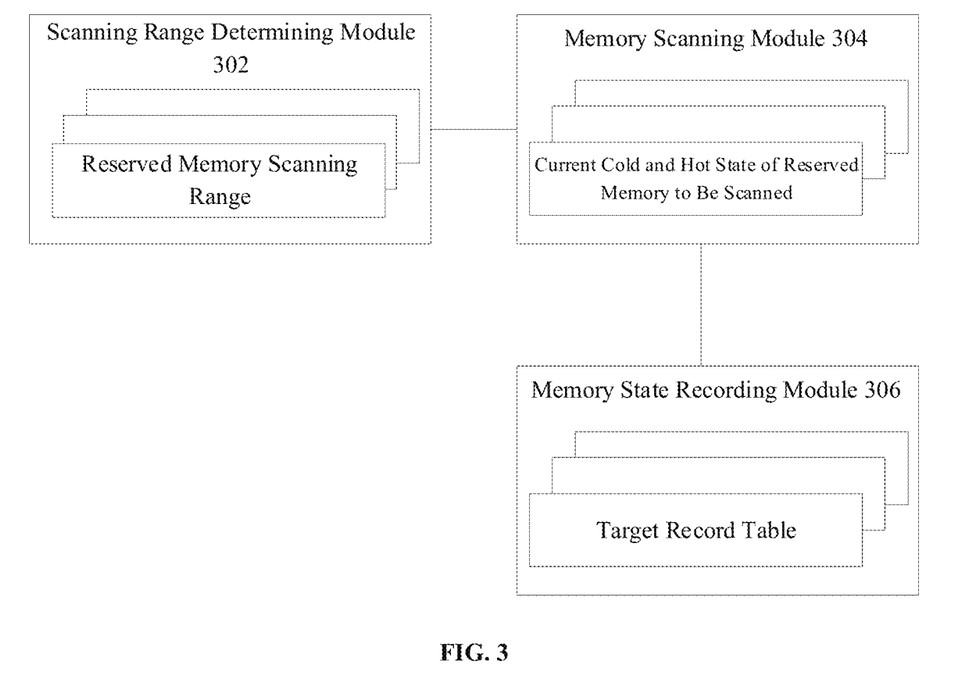
FIG. 3 is a schematic structural diagram of the memory scanning apparatus provided by one embodiment of this specification.

Corresponding to the above method embodiment, this specification also provides an embodiment of a memory scanning apparatus. FIG. 3 shows a structural schematic diagram of the memory scanning apparatus provided by one embodiment of this specification. As shown in FIG. 3, the apparatus includes:

a scanning range determining module 302 configured for determining a reserved memory scanning range at a preset time interval, wherein reserved memory constitutes part of host memory;

a memory scanning module 304 configured for scanning the reserved memory to be scanned within the reserved memory scanning range and determining the current cold and hot state of the reserved memory to be scanned; and a memory state recording module 306 configured for determining a target record table for the current cold and hot state of the reserved memory to be scanned according to the current cold and hot state of the reserved memory to be scanned and recording the current cold and hot state of the reserved memory to be scanned into the target record table.

Optionally, the memory scanning module 304 is further configured for:
determining a physical memory address of the reserved memory to be scanned within the reserved memory scanning range;
determining a virtual address corresponding to the physical memory address of the reserved memory to be scanned by a preset query method, in a case that there is a virtual page table; and
traversing and querying an access bit of the corresponding virtual page table through the virtual address and determining the current cold and hot state of the reserved memory to be scanned according to a current set state of the access bit.

Optionally, the memory scanning module 304 is further configured for:
determining the target record table corresponding to the reserved memory scanning range, wherein the target record table includes a target hot page record table and a target cold page record table;
determining the physical memory address of the reserved memory to be scanned in the target cold page record table; and
determining the physical memory address of the reserved memory to be scanned in the target hot page record table, in a case that all the reserved memory to be scanned in the target cold page record table has been scanned and the target cold page record table or the target hot page record table meets the preset scanning condition.

Optionally, the memory scanning module 304 is further configured for:
determining, in a case that there is a cache memory mapping structure corresponding to the physical memory address of the reserved memory to be scanned, the virtual address corresponding to the physical memory address of the reserved memory to be scanned according to the cache memory mapping structure; or acquiring a linked list of a memory mapping structure for allocating the reserved memory and adding a linked list lock to the linked list of the memory mapping structure, in a case that there is no cache memory mapping structure corresponding to the physical memory address of the reserved memory to be scanned;

traversing the linked list of the memory mapping structure to determine the memory mapping structure corresponding to the physical memory address of the reserved memory to be scanned; and determining the virtual address corresponding to the physical memory address of the reserved memory to be scanned according to the memory mapping structure and adding the memory mapping structure to the cache.

Optionally, the memory scanning module 304 is further configured for:

traversing and querying the access bit of the corresponding virtual page table through the virtual address;

determining the current set state of the access bit, in a case that the query is successful; and determining whether the current set state has been set, if yes, clearing the current set state of the access bit and determining that the current cold and hot state of the reserved memory to be scanned is a hot state; and if no, traversing and querying an access bit of a corresponding kernel page table through the virtual address, and determining the current cold and hot state of the reserved memory to be scanned according to the current set state of the access bit of the memory page table.

Optionally, the memory scanning module 304 is further configured for:

traversing and querying the access bit of the corresponding virtual page table through the virtual address and determining the current set state of the access bit of the kernel page table; and determining whether the current set state has been set, if yes, clearing the current set state of the access bit and determining that the current cold and hot state of the reserved memory to be scanned is a hot state; and if no, determining that the current cold and hot state of the reserved memory to be scanned is the cold state.

Optionally, the memory state recording module 306 is further configured for:

in a case that the current cold and hot state of the reserved memory to be scanned in the target hot page record table is a hot state, determining the target hot page record table corresponding to the hot state of the reserved memory to be scanned and recording the hot state of the reserved memory to be scanned into the target hot page record table;

in a case that the current cold and hot state of the reserved memory to be scanned in the target hot page record table is a cold state, determining the target cold page record table corresponding to the cold state of the reserved memory to be scanned, deleting the reserved memory to be scanned in the target hot page record table and recording the cold state of the reserved memory to be scanned into the target cold page record table; or in a case that the current cold and hot state of the reserved memory to be scanned in the target cold page record table is a hot state, determining the target hot page record table corresponding to the hot state of the reserved memory to be scanned, deleting the reserved memory to be scanned in the target cold page record table and recording the hot state of the reserved memory to be scanned into the target hot page record table; and in a case that the current cold and hot state of the reserved memory to be scanned in the target cold page record table is a cold state, determining the target cold page record table corresponding to the cold state of the reserved memory to be scanned and recording the cold state of the reserved memory to be scanned into the target cold page record table.

Optionally, the memory state recording module 306 is further configured for:

in a case that the current cold and hot state of the reserved memory to be scanned is the hot state, determining the target hot page record table corresponding to the hot state of the reserved memory to be scanned and recording the hot state of the reserved memory to be scanned into the target hot page record table; and in a case that the current cold and hot state of the reserved memory to be scanned is the cold state, determining the target cold page record table corresponding to the cold state of the reserved memory to be scanned and recording the cold state of the reserved memory to be scanned into the target cold page record table.

Optionally, the apparatus further includes:

a reserved memory adding module configured for:

adding, in a case that there is new reserved memory and the reserved memory to be scanned has been scanned, the new reserved memory to the reserved memory scanning range.

Optionally, the apparatus further includes:

a reserved memory release module configured for:

acquiring a scanning range lock and suspending the scanning of the reserved memory to be scanned within the reserved memory scanning range, in a case that there is reserved memory to be scanned within the reserved memory scanning range being released; and deleting the released reserved memory to be scanned from the reserved memory scanning range and deleting the memory mapping structure corresponding to the released reserved memory to be scanned and the cold and hot state of the released reserved memory to be scanned in the target record table.

Optionally, the memory state recording module 306 is further configured for:

recording the cold state of the reserved memory to be scanned to the end of the target cold page record table; and accordingly, the recording the hot state of the reserved memory to be scanned into the target hot page record table includes:

recording the hot state of the reserved memory to be scanned to the end of the target hot page record table.

In the memory scanning apparatus provided in the embodiment of the specification, cold and hot scanning is periodically (at a preset time interval) performed on the reserved memory in the host memory, and the current cold and hot state of the reserved memory of each cold and hot scanning is recorded into a target record table, such that cold and hot changes in the reserved memory may be subsequently queried according to the target record table, and the cold and hot aging of the reserved memory may be determined according to the cold and hot changes of the reserved memory in the target record table.

The above is a schematic scheme of a memory scanning apparatus of this embodiment. It should be noted that the technical scheme of the memory scanning apparatus belongs to the same concept as the technical scheme of the memory scanning method described above, and all details not described in detail in the technical scheme of the memory scanning apparatus may be found in the description of the technical scheme of the memory scanning method described above.

Figure 4:
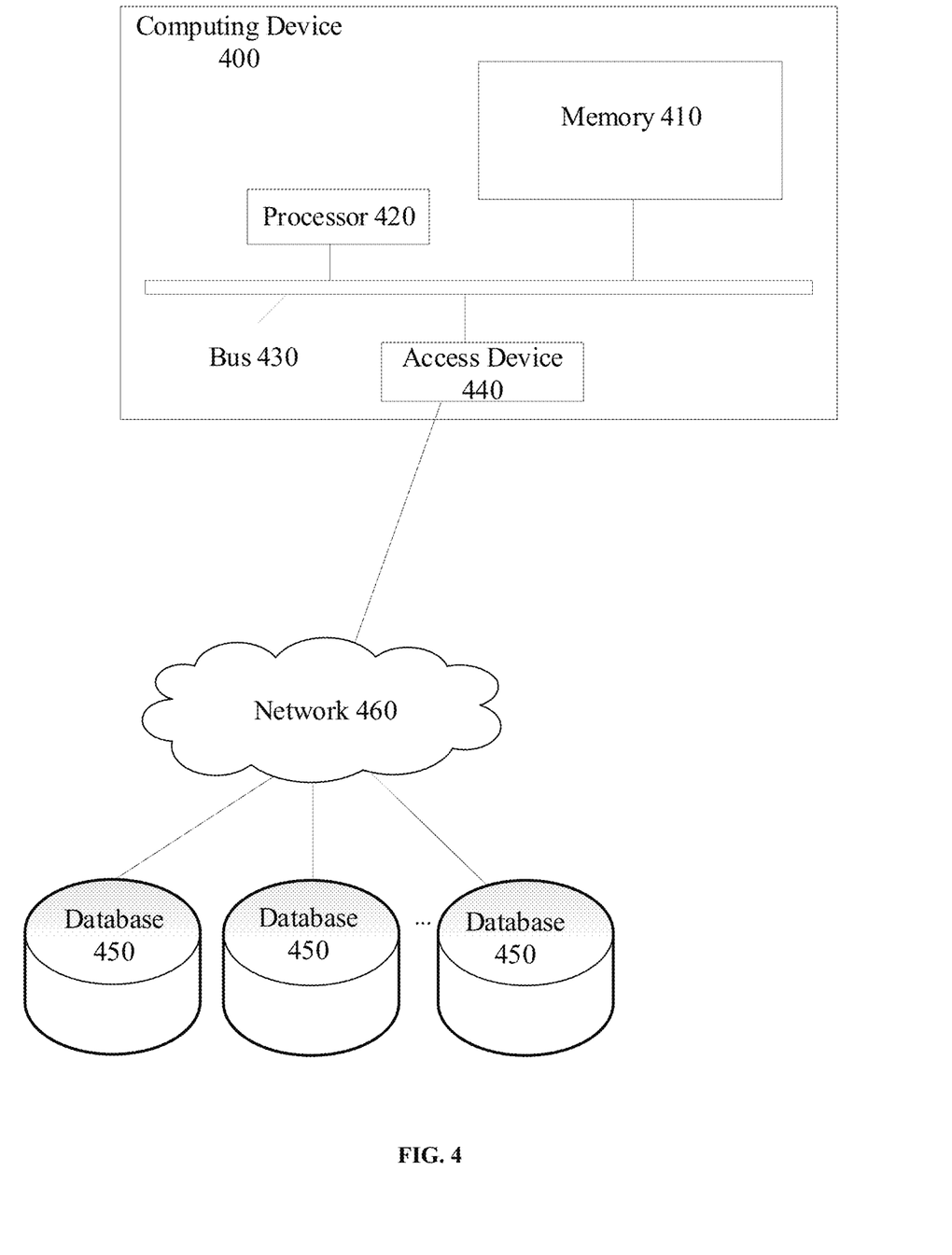
FIG. 4 is a structural block diagram of the computing device provided by one embodiment of this specification.

FIG. 4 shows a structural block diagram of the computing device 400 provided according to one embodiment of this specification. The components of the computing device 400 include, but are not limited to, a memory 410 and a processor 420. The processor 420 is connected with the memory 410 via a bus 430. A database 450 is used to store data.

The computing device 400 further includes an access device 440 that enables the computing device 400 to communicate via one or more networks 460. Examples of these networks include the public switched telephone network (PSTN), local area network (LAN), wide area network (WAN), personal area network (PAN) or a combination of communication networks such as the Internet. The access device 440 may include one or more of any type of network interfaces (e.g., a network interface card (NIC)), wired or wireless, such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface and a near field communication (NFC) interface.

In one embodiment of this specification, the above components of the computing device 400 and other components not shown in FIG. 4 may also be connected to each other, for example, via a bus. It should be understood that the block diagram of the computing device shown in FIG. 4 is only for the purpose of illustration and is not a limitation on the scope of this specification. Those skilled in the art may add or replace other components as needed.

The computing device 400 may be any type of static or mobile computing device, including a mobile computer or a mobile computing device (e.g., a tablet computer, a personal digital assistant, a laptop computer, a notebook computer, a netbook, etc.), a mobile phone (e.g., a smart phone), a wearable computing device (e.g., a smart watch, smart glasses, etc.) or other types of mobile devices, or static computing devices such as a desktop computer or a PC. The computing device 400 may also be a mobile or stationary server.

Among others, the processor 420 is configured for executing the computer-executable instructions that, when executed by the processor, implement the steps of the memory scanning method described above.

The above is a schematic scheme of a computing device of this embodiment. It should be noted that the technical scheme of the computing device belongs to the same concept as the technical scheme of the above-mentioned memory scanning method, and all details not described in detail in the technical scheme of the computing device may be found in the description of the technical scheme of the above-mentioned memory scanning method.

In an embodiment of this specification, there is also provided a computer-readable storage medium having computer-executable instructions stored thereon that, when executed by a processor, implement the steps of the memory scanning method described above.

The above is a schematic scheme of a computer-readable storage medium of this embodiment. It should be noted that the technical scheme of the storage medium belongs to the same concept as the technical scheme of the memory scanning method described above, and all details not described in detail in the technical scheme of the storage medium may be found in the description of the technical scheme of the memory scanning method described above.

In an embodiment of the present specification, there is also provided a computer program, wherein when executed in a computer, the computer program causes the computer to perform the steps of the memory scanning method described above.

The above is a schematic scheme of the computer program of this embodiment. It should be noted that the technical scheme of the computer program belongs to the same concept as the technical scheme of the above-mentioned memory scanning method, and all details not described in detail in the technical scheme of the computer program may be found in the description of the technical scheme of the above-mentioned memory scanning method.

The specific embodiments of this specification have been described above. Other embodiments are also within the scope of the appended claims. In some cases, the actions or steps recited in the claims may be performed in a different order than in the embodiments and still achieve the desired results. In addition, the processes depicted in the drawings do not necessarily require the specific order shown or the sequential order to achieve the desired results. In certain embodiments, multitasking and parallel processing are also possible or may be advantageous.

The computer instructions include computer program code, which may be in a source code form, an object code form, an executable file or certain intermediate forms, etc. The computer-readable medium may include any entity or means capable of carrying the computer program code, recording medium, U disk, mobile hard disk, magnetic disk, optical disk, computer memory, Read-Only Memory (ROM), Random Access Memory (RAM), electric carrier signal, telecommunication signal, software distribution medium, etc. It should be noted that the contents contained in the computer-readable medium may be appropriately increased or decreased according to the requirements of legislation and patent practice in the jurisdiction. For example, in certain jurisdictions, according to legislation and patent practice, the computer-readable medium does not include any electric carrier signal or telecommunication signal.

It should be noted that for the sake of simple description, all the aforementioned method embodiments are expressed as combinations of a series of action, but those skilled in the art should know that the embodiments of this specification are not limited to the order of actions described. According to the embodiments described in this specification, certain steps may be performed in other orders or simultaneously. Those skilled in the art should also know that the embodiments described in the specification are all preferred embodiments, and not all actions and modules involved are necessarily required for the embodiments in this specification.

In the above-mentioned embodiments, the description of each embodiment has its own emphasis. For the parts not detailed in one embodiment, please refer to the relevant descriptions of other embodiments.

The preferred embodiments of this specification disclosed above are only used to assist in setting forth this specification. Alternative embodiments do not elaborate on all the details, nor do they limit the invention to the specific implementation described. Obviously, many modifications and changes may be made according to the contents of the embodiments in this specification. These embodiments are selected and described in detail in this specification in order to better explain the principles and practical applications of the embodiments in this specification, so that those skilled in the art can better understand and make use of this specification. This specification is limited only by the claims and their full scope and equivalents thereof.

What is claimed is:

1. A memory scanning method applied to a host, comprising:
   determining a scanning range of reserved memory to be scanned at a preset time interval, wherein the reserved memory is a part of host memory reserved therefrom;
   scanning the reserved memory within the scanning range and determining a current state of the reserved memory, wherein the state comprises a hot state or a cold state; and
   determining a target record table corresponding to the current state of the reserved memory according to the current state of the reserved memory, wherein the target record table comprises a target hot page record table and a target cold page record table, and recording the current state of the reserved memory into the corresponding target hot page record table or the target cold page record table;
   wherein the scanning the reserved memory within the scanning range and determining the current state of the reserved memory comprises:
   determining a physical memory address of the reserved memory within the scanning range;
   determining a virtual address corresponding to the physical memory address of the reserved memory by a preset query method, if there is a virtual page table; and
   traversing and querying an access bit of the corresponding virtual page table through the virtual address and determining the current state of the reserved memory according to a current state of the access bit.

2. The memory scanning method of claim 1, wherein the determining the physical memory address of the reserved memory comprises:
   determining the target hot page record table and the target cold page record table corresponding to the scanning range;
   determining the physical memory address of the reserved memory to be scanned in the target cold page record table; and
   determining the physical memory address of the reserved memory to be scanned in the target hot page record table, if all the reserved memory to be scanned in the target cold page record table has been scanned and the target cold page record table or the target hot page record table meets a preset scanning condition.

3. The memory scanning method of claim 1, wherein the determining the virtual address corresponding to the physical memory address of the reserved memory by the preset query method comprises:
   determining, if there is a cache memory mapping structure corresponding to the physical memory address of the reserved memory, the virtual address corresponding to the physical memory address of the reserved memory according to the cache memory mapping structure; or
   acquiring a linked list of a memory mapping structure for allocating the reserved memory and adding a linked list lock to the linked list of the memory mapping structure, if there is no cache memory mapping structure corresponding to the physical memory address of the reserved memory;
   traversing the linked list of the memory mapping structure to determine the memory mapping structure corresponding to the physical memory address of the reserved memory; and
   determining the virtual address corresponding to the physical memory address of the reserved memory according to the memory mapping structure and adding the memory mapping structure to a cache.

4. The memory scanning method of claim 2, wherein the traversing and querying the access bit of the corresponding virtual page table through the virtual address and determining the current state of the reserved memory according to the current state of the access bit comprises:
   traversing and querying the access bit of the corresponding virtual page table through the virtual address;
   determining the current state of the access bit, if that the query is successful; and
   determining whether the current state has been set,
   if true, clearing the current state of the access bit and determining that the current state of the reserved memory is a hot state; and
   if false, traversing and querying an access bit of a corresponding kernel page table through the virtual address and determining the current state of the reserved memory according to the current state of the access bit of the kernel page table.

5. The memory scanning method of claim 4, wherein the traversing and querying the access bit of the corresponding kernel page table through the virtual address and determining the current state of the reserved memory according to the current state of the access bit of the kernel page table comprises:
   traversing and querying the access bit of the corresponding virtual page table through the virtual address and determining the current state of the access bit of the kernel page table; and
   determining whether the current state has been set,
   if true, clearing the current state of the access bit and determining that the current state of the reserved memory is a hot state; and
   if false, determining that the current state of the reserved memory is a cold state.

6. The memory scanning method of claim 5, wherein the determining the target record table corresponding to the current state of the reserved memory according to the current state of the reserved memory and recording the current state of the reserved memory into the corresponding target hot page record table or the target cold page record table comprises:
   if the current state of the reserved memory in the target hot page record table is a hot state, determining the target hot page record table corresponding to the hot state of the reserved memory and recording the hot state of the reserved memory into the target hot page record table;
   if the current state of the reserved memory in the target hot page record table is a cold state, determining the target cold page record table corresponding to the cold state of the reserved memory, deleting the reserved memory in the target hot page record table and recording the cold state of the reserved memory into the target cold page record table; or
   if the current state of the reserved memory in the target cold page record table is a hot state, determining the target hot page record table corresponding to the hot state of the reserved memories to be scanned, deleting the reserved memory in the target cold page record table and recording the hot state of the reserved memory into the target hot page record table; and if the current state of the reserved memory in the target cold page record table is a cold state, determining the target cold page record table corresponding to the cold state of the reserved memory and recording the cold state of the reserved memory into the target cold page record table.

7. The memory scanning method of claim 1, wherein the determining the target record table corresponding to the current state of the reserved memory according to the current state of the reserved memory and recording the current state of the reserved memory into the corresponding target hot page record table or the target cold page record table comprises:

if the current state of the reserved memory is a hot state, determining the target hot page record table corresponding to the hot state of the reserved memory and recording the hot state of the reserved memory into the target hot page record table; and if the current state of the reserved memory is a cold state, determining the target cold page record table corresponding to the cold state of the reserved memory and recording the cold state of the reserved memory into the target cold page record table.

8. The memory scanning method of claim 1, further comprising:

adding, if there is new reserved memory and the scanning of the reserved memory within the scanning range has been finished, the new reserved memory to the scanning range.

9. The memory scanning method of claim 1, further comprising:

acquiring a scanning range lock and suspending the scanning of the reserved memory within the scanning range, if there is reserved memory within the scanning range being released; and deleting the released reserved memory from the scanning range and deleting a memory mapping structure corresponding to the released reserved memory and the cold and hot state of the released reserved memory in the target record table.

10. The memory scanning method of claim 6, wherein the recording the cold state of the reserved memory into the target cold page record table comprises:

recording the cold state of the reserved memory to an end of the target cold page record table; and the recording the hot state of the reserved memory into the target hot page record table comprises:

recording the hot state of the reserved memory to an end of the target hot page record table.

11. A computing device, comprising:
a memory and a processor;
wherein the memory is configured for storing computer-executable instructions, and the processor is configured for executing the computer-executable instructions that, when executed by the processor, implement the steps of the memory scanning method of claim 1.

12. A computer-readable storage medium having computer-executable instructions stored thereon that, when executed by a processor, implement the steps of the memory scanning method of claim 1.

13. The memory scanning method of claim 2, wherein the determining the virtual address corresponding to the physical memory address of the reserved memory by the preset query method comprises:

determining, if there is a cache memory mapping structure corresponding to the physical memory address of the reserved memory, the virtual address corresponding to the physical memory address of the reserved memory according to the cache memory mapping structure; or acquiring a linked list of a memory mapping structure for allocating the reserved memory and adding a linked list lock to the linked list of the memory mapping structure, if there is no cache memory mapping structure corresponding to the physical memory address of the reserved memory;

traversing the linked list of the memory mapping structure to determine the memory mapping structure corresponding to the physical memory address of the reserved memory; and determining the virtual address corresponding to the physical memory address of the reserved memory according to the memory mapping structure and adding the memory mapping structure to a cache.

14. A computer-readable storage medium having computer-executable instructions stored thereon that, when executed by a processor, implement the steps of the memory scanning method of claim 5.

15. A computer-readable storage medium having computer-executable instructions stored thereon that, when executed by a processor, implement the steps of the memory scanning method of claim 2.

16. A computer-readable storage medium having computer-executable instructions stored thereon that, when executed by a processor, implement the steps of the memory scanning method of claim 3.

17. A computer-readable storage medium having computer-executable instructions stored thereon that, when executed by a processor, implement the steps of the memory scanning method of claim 13.

18. A computer-readable storage medium having computer-executable instructions stored thereon that, when executed by a processor, implement the steps of the memory scanning method of claim 4.

* * * * *